United States Patent Office 2,921,072
Patented Jan. 12, 1960

2,921,072
NICOTINIC ACID SUBSTITUENTS OF BARBITURIC ACID

Edgar A. Ferguson, Jr., Brooklyn, N.Y.

No Drawing. Application October 18, 1956
Serial No. 616,896

6 Claims. (Cl. 260—256.4)

This invention relates to new and novel chemical compositions and more particularly to the novel chemical compounds of nicotinyl barbiturates.

It is an object of the present invention to provide a novel series of derivatives of barbituric acid which have unexpected and superior soporific properties and which have a high therapeutic index (the ratio of therapeutic to lethal dose being low).

Further objects of this invention are to provide nicotinyl barbiturates of differing times of therapeutic action.

Additional objects of this invention will be apparent to those skilled in the art from a reading of the specifications and appended claims.

It is well known that barbituric acid 2,4,6(1H,3H5H)-pyrimidinetrione or its enol forms, is not a hypnotic or soporific substance. However certain forms in which substituents replace two of the hydrogen atoms in the molecule of barbituric acid have enjoyed a reputation for hypnotic and soporific action which is widespread. Unfortunately, in spite of the therapeutic importance of the barbiturates a great deal of toxicity has attached to their use. This toxicity is in part due to the fact that the central nervous system is depressed and therefore the individual taking the barbiturate is forced to sleep. However, large animals, including human beings, are not usually killed by merely being forced to sleep even for long periods of time. It has been discovered, in accordance with the present invention, that the reason for the toxicity of barbital is that it poisons the action of co-enzyme 1 and co-enzyme 2 in the body. These are the oxidative enzymes and their failure may produce death. These enzymes are based upon the pyridyl molecule. One of the important pyridyl molecules utilized in combating poisoning and failure of co-enzyme 1 and co-enzyme 2, the di- and tri-phosphonucleotides, is nicotinic acid. This acid supplies the essential portion of the pyridine nucleus necessary for the reconstitution of co-enzyme 1 and co-enzyme 2, the oxidative enzymes, in the body. When this molecule is supplied as an integral portion of the molecule of the soporific, its action, which is vitamin-like, is most effective. Consequently, when nicotinyl barbiturates are used the therapeutic index, the ratio of therapeutic to lethal dose, is greatly improved. The reduction of toxicity by the oxidative co-enzymes results in a relatively nontoxic barbiturate.

Barbituric acid being 2,4,6 (1H,3H5H)-pyrimidinetrione, is represented as follows:

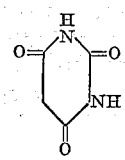

It is more conveniently represented however for the purposes of this discussion by the following structural formula:

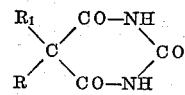

In this structural formula R and R' represent hydrogen atoms for barbituric acid. In the general process for the manufacture of nicotinyl barbiturate the first step is to make either the mono- or the di- sodium salt of barbituric acid. This is accomplished by choosing stoichiometric amounts of sodium in sodium slurry. The sodium slurry which consists of sodium metal in oil is added to a benzene suspension of barbituric acid. The resultant product, sodium barbiturate, may then be separated from the benzene solution by centrifuging and drying the resultant sodium barbiturate. In accordance with the amount of sodium used the di-sodium or the mono-sodium derivative may be prepared. For convenience in processing it is also possible to leave the sodium salt of barbituric acid in the benzene suspension.

Nicotinic acid is pyridine 3 carboxylic acid in accordance with the following structural formula:

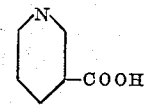

The nicotinic acid is converted to nicotinyl chloride by any of the usual processes. These include the use of thionyl chloride in which the yield may be low due to some destruction of the pyridyl nucleus, phosphorus oxychloride, or phosphorus pentachloride. Which ever method is used the final result is nicotinyl chloride in which the hydrogen ion of the COOH group is replaced by chlorine.

When stoichiometric amounts of nicotinyl chloride are added to the benzene suspension of sodium barbiturate the resultant reaction yields sodium chloride which is precipitated from the benzene solution and nicotinyl barbiturate. In accordance with the starting materials and the chosen amount of nicotinyl chloride the mono- or the di- nicotinyl barbiturate is obtained.

It is possible to also prepare nicotinamide barbiturate. In this case the starting material instead of being nicotinic acid is the amide of nicotinic acid.

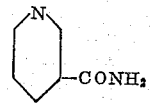

The general method of preparation of nicotinamide barbiturate is to suspend and partly dissolve stoichiometric amounts of barbituric acid in benzene, to this add an equal stoichiometric amount of niacinamide (nicotinic acid amide) which is slightly soluble in benzene. These are refluxed for a period of 8 hours. At the end of this time some crystals will form and on cooling crystals of niacinamide barbiturate will separate out.

Another niacinamide barbiturate may be prepared by utilizing substituted barbturic acid for instance in the form of phenobarbital which is phenol ethyl barbituric acid, a barbituric acid derivative in which R in the above formula is substituted by an ethyl group and R' is substituted by a phenyl group. The general method of preparation of niacinamide phenyl ethyl barbituric acid is to dissolve phenyl barbital in benzene, add a stoichiometric amount of niacinamide and reflux for a period of 5 hours. Crystals will being to form and on cooling these crystals may be separated out by filtration.

As another alternative method for the preparation of mono- or di- nicotinyl barbiturate it is possible to react the proper stoichiometric amount of nicotinyl chloride directly with barbituric acid. In this instance the general method of preparation includes the suspension of barbituric acid in benzene and the addition of small amounts of pyridine to use up the hydrochloric acid formed as a result of the reaction. A stated quantity of barbituric acid is placed in benzene, approximately 6 volumes of benzene to an equal weight of barbituric acid. Small portions of pyridine are added and approximately stoichiometric amounts of nicotinyl chloride to use up and neutralize the pyridine base added at a slow rate until the stoichiometric amount of nicotinyl chloride has been added to make either the mono- or the di- nicotinyl barbiturate and the amount of chlorine liberated to form hydrochloric acid has been exactly used by the pyridine base added which forms pyridine hydrochloride. The pyridine hydrochloride is precipitated from the benzene solution.

It is further possible to prepare mono-nicotinyl barbituric acid in which R is substituted by the nicotinic acid residue (nicotinyl) and R' is substituted by an alkyl group, an aryl group, a cyclic compound, or a hexane. As an example of the general method of preparation of an alkyl mono-nicotinyl barbituric acid it is possible to make sodium barbiturate either by reacting, as stated above, barbituric acid with sodium slurry directly or by reacting barbituric acid with sodium ethylate so that 1 mol of sodium reacts with 1 of barbituric acid thus forming mono-sodium barbituric acid. In the case of the use of sodium ethylate it is necessary to eliminate the ethyl alcohol formed in the reaction by distillation under partial vacuum. Having thus formed mono-sodium barbiturate this mono-sodium barbiturate is reacted with 1 mol of phenyl bromide (or phenyl iodide). The sodium halide splits out leaving mono-phenyl barbituric acid. This mono-phenyl barbituric acid is again reacted with sodium barbiturate and the sodium derivative of phenyl barbituric acid is then separated. This is reacted with 1 mol of nicotinyl chloride to form phenyl nicotinyl barbiturate.

Further addition of nicotinyl groups can be made to the di-nicotinyl barbiturate or to the mono-nicotinyl barbiturate in which the other substituent is an alkyl, a cyclic compound or a hexane. Thus it is possible to react di-nicotinyl barbiturate with sodium in the form of sodium ethylate to form the sodium salt of di-nicotinyl barbiturate. This sodium salt may in turn react with di-nicotinyl barbiturate to form tri-nicotinyl barbiturate. To go further the tri-nicotinyl barbiturate may again be reacted with sodium ethylate in stoichiometric proportions to form the sodium salt of tri-nicotinyl barbiturate which if reacted with nicotinyl chloride will form tetra-nicotinyl barbiturate. By the same method the mono-nicotinyl salt of barbituric acid, nicotinyl barbiturate, which has an alkyl, an aryl, a cyclic compound, or a hexyl compound in position R' may be further reacted to form a di-nicotinyl derivative or a tri-nicotinyl derivative in addition to the alkyl, the aryl, cyclic or the hexyl substitution thus forming such compounds as tri-nicotinyl phenobarbital.

Note that it is possible to stop in any of the compounds after the formation of the sodium salt of the substituted compound and thus make the sodium salt of mono-nicotinyl barbiturate, of di-nicotinyl barbiturate, of tri-nicotinyl barbiturate.

Nicotinyl derivatives may be formed which substitute the nicotinyl radical of the amide derivative, not R or R' thus taking advantage of the NH group, the urea residue, the amide group interspersed between the carbonyl groups which still has an active residue—there being active hydrogens of the NH groups which will react with nicotinyl chloride. Thus the phenobarbital of commerce which is phenyl ethyl barbiturate can be di- rectly reacted in benzene solution with nicotinyl derivative of phenobarbital. Thus any combination of alkyl, aryl, cyclic, or hexyl subsituents at position R and R' in combination with barbituric acid can be reacted with nicotinyl chloride in stiochiometric proportions in an organic solvent preferably in the presence of pyridine to neutralize the hydrochloric acid formed as an alternative method the sodium salt of the substituted barbituric acid can react with nicotinyl chloride. Thus the sodium phenobarbital of commerce which is the mono-sodium salt of phenyl ethyl barbiturate will react directly with the nicotinyl chloride in a solution of benzene which suspends the sodium phenobarbital thus forming sodium chloride and nicotinyl phenyl ethyl barbiturate. This reaction could also be accomplished with the di-sodium salt of phenobarbital being the di-sodium salt of phenyl ethyl barbituric acid which could react with 2 mols of nicotinyl chloride forming di-nicotinyl derivative of phenyl ethyl barbiturate.

In naming the basic compound of this series which involves the substitution of the carbonyl groups which are interspersed between the amides if the carbon atom which normally carries the substituents R and R' is numbered for 2 carbons then the name is 2,2 di-nicotinyl 4,6 di-nicotinyl barbituric acid.

A method of formation of the sodium derivative of di-substituted barbituric acids is to add a stoichiometric amount of sodium bicarbonate and warm the aqueous solution therewith. Water is then distillled off and the residue is the sodium salt of a di-substituted barbituric acid. This method is also applicable to tri-substituted barbituric acids.

As a further theory of action, this being descriptive and not limiting, it has been shown that pyridine can be substituted on the carbon 5 of barbituric acid to form a barbiturate, this substituent being attached directly to the 2,3,4, or 5 position of the pyridine ring. That this pyridine compound will not supply the essential nucleus of the di- and tri-phosphonucleotides (coenzyme 1 and 2, the oxidative enzymes) in the human metabolism is demonstrated by the fact that pyridine has no effect on pellagra. On the other hand nicotinic acid completely relieves the syndrome of pellagra and supplies the essential nucleus of di- and tri-phosphonucleotides. In addition it has been shown that the nicotinyl portion of the nicotinic acid residue is all that is necessary to accomplish the effect noted in pellagra. This is demonstrated by the fact that nicotinic acid amide has an identical effect on pellagra as nicotinic acid. Thus the only portion of the nicotinic acid residue necesary in human metabolism is represented by the following structural formula:

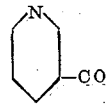

(Nicotinyl) nicotinic acid residue

It is this residue which is substituted on carbon 8 of the barbituric acid derivative which is the product of this invention. It is this residue which is combined with an amide radical to form nicotinic acid amide. So long as this residue is present the full effect on human metabolism is possible. It has been further shown that other pyridines do not affect human metabolism in regard to pellagra. Notable among these is isonicotinyl hydrazine which is related to pyridine but is not a nicotinic acid compound, the hydrazine carbon atom being attached at position 4 of the pyridine ring.

PREPARATION OF SODIUM SALTS OF BARBITURIC ACID AND BARBITURIC ACID DERIVATIVES

Take 128 grams of barbituric acid. Add to 200 cc. dry benzene. To this emulsion add 23 grams of sodium in the form of sodium slurry (mixed in oil) which is diluted with 50 cc. of dry benzene. This mixture may be utilized directly for the preparation of further derivatives or the benzene and oil separated from the residue and the residue may be dried. The residue consists of mono-sodium barbiturate.

An alternative method of preparation is as follows: Take 128 grams of barbituric acid. Add 68 grams of sodium ethylate dissolved in 400 grams of dry benzene. If the residue is slow in forming add an additional quantity (approximately 200 cc.) of dry benzene. The residue may be separated by filtration and dried. The residue is mono-sodium barbiturate.

To prepare di-sodium barbiturate utilize a ratio of 46 sodium slurry to 128 grams of barbituric acid and in the alternate method utilize 136 grams of sodium ethylate to 128 grams of barbituric acid. Thus, di-sodium barbiturate is prepared.

PREPARATION OF SODIUM SALTS OF SUBSTITUTED BARBITURIC ACID DERIVATIVES

In 300 grams of water add 84 grams of sodium bicarbonate. To this solution add one of the following:

251 grams of nicotinyl barbiturate (mono-nicotinyl), 374 grams of di-nicotinyl barbiturate, 311 grams of nicotinyl phenyl barbiturate, etc. In each case the sodium salt of the respective compounds is formed when the mixture is gently warmed and stirred at about 85° C. Water is removed by distillation. Sodium phenyl ethyl barbiturate is available commercially as a U.S.P. product. Sodium di-ethyl barbiturate is available commercially as an N.F. product.

PREPARATION OF NICOTINYL CHLORIDE

Nicotinyl chloride is available commercially and a description of its preparation is found in Beilstein, 4th edition, vol. 22, p. 38.

Example 1

Place 150 grams of sodium barbiturate in 200 grams of benzene, stir to form a suspension. Add 158 grams of nicotinyl chloride. The solution is warmed to 40° C. and thoroughly stirred. The precipitate of sodium chloride is removed and the benzene distilled to leave a residue of mono-nicotinyl barbiturate.

Example 2

172 grams of di-sodium barbituric acid is added to 200 grams of benzene and the solution stirred to form a suspension. To this suspension is added 316 grams of nicotinyl chloride. The solution is warmed to 40° C. for a period of 10 minutes with stirring. The sodium chloride precipitate is removed by filtration and the benzene distilled off under conditions of partial vacuum. The residue is di-nicotinyl barbiturate.

Example 3

Add 122 grams of nicotinic acid amide (niacinamide) to 400 cc. of benzene. Add 128 grams of barbituric acid. Stir and warm to 85° C. for a period of 8 hours. When crystals begin to form the benzene solution is chilled and crystals are filtered out. The resultant product is niacinamide barbiturate.

Example 4

Add 200 grams of 5 ethyl 5 phenyl barbiturate (phenobarbital) to 200 cc. of benzene. The phenobarbital is soluble in benzene. Add 122 grams of niacinamide. The niacinamide is only partly soluble in benzene. The solution is stirred vigorously and warmed to a temperature of 75° C. for a period of 5 hours. As soon as the crystals begin to form the solution is chilled and after chilling the crystals separated out. The resultant product is niacinamide phenyl ethyl barbiturate.

Example 5

Place 128 grams of barbituric acid in 200 cc. of benzene. Add 8 grams of pyridine base. Add slowly with stirring 15.8 grams of nicotinyl chloride. Allow this mixture to react for 5 minutes at a temperature of 40° C. Repeat this process 10 times. The pyridine hydrochloride is insoluble and is removed by filtration. Benzene is removed by distillation in partial vacuum and the resultant product is mono-nicotinyl barbiturate.

Example 6

128 grams of barbituric acid are added to 200 cc. of dry benzene. To this 16 grams of pyridine base is added. Then 31.6 gram portions of nicotinyl chloride are added. The mixture is stirred and warmed to 40° C. for 5 minutes. This process is repeated 10 times. The pyridine hydrochloride is removed by filtration. Benzene is removed by distillation in partial vacuum. The resultant product is di-nicotinyl barbiturate.

Example 7

Take 150 grams of sodium barbiturate (mono-sodium barbiturate) and add to 200 cc. of dry benzene. To this suspension add 157 grams of bromobenzene. Sodium bromide is precipitated and may be separated by filtration. Mono-phenyl barbiturate is formed. 68 grams of sodium ethylate are again added to the benzene solution containing the mono-phenyl barbiturate. The sodium salt of mono-phenyl barbiturate is formed which is insoluble when additional benzene is added to the mixture. The residue is separated and is added to 200 cc. of dry benzene. To this suspension is added 158 grams of nicotinyl chloride. The sodium chloride is removed by filtration and the benzene by distillation in partial vacuum. The resultant product is phenyl nicotinyl barbiturate.

Example 8

372 grams of di-nicotinyl barbiturate are dissolved partially in 5 volumes of water. To this is added 84 grams of sodium bicarbonate. The mixture is stirred and warmed to 85° C. for a period of 1½ hours. Water is then eliminated by distillation under partial vacuum to form the sodium salt of di-nicotinyl barbiturate. 395 grams of sodium di-nicotinyl barbiturate are added to 200 grams of dry benzene. To this suspension 158 grams of nicotinyl chloride is added. 200 cc. of additional dry benzene is added to the mixture to help precipitate the sodium chloride and solubilize the reaction product. Sodium chloride is removed by filtration and benzene is removed by distillation in partial vacuum. The product of this reaction is tri-nicotinyl barbiturate.

Example 9

495 grams of tri-nicotinyl barbiturate are suspended in 400 cc. of cold, dry benzene. 68 grams of sodium ethylate are added. The mixture is allowed to stand at room temperature for 2 hours. The sodium salt of tri-nicotinyl barbiturate separates out in crystals. As soon as this crystal formation begins the mixture is again chilled and 100 cc. additional benzene added. The sodium salt of tri-nicotinyl barbiturate is separated by filtration. This is dried to remove the ethyl alcohol. The residue is placed in 200 cc. of dry benzene. To this suspension is added 158 grams of nicotinyl chloride. Additional benzene is added (approximately 200 cc.) until the reaction product is largely dissolved and the chloride can be separated by filtration. Benzene is removed by distillation in partial vacuum. The product of this reaction is tetra-nicotinyl barbiturate.

Example 10

254 grams of sodium 5 ethyl 5 phenyl barbiturate are suspended in 200 cc. of benzene. To this suspension 158 grams of nicotinyl chloride is added. An additional 200 cc. of benzene is added to help precipitate the sodium chloride formed. The sodium chloride is removed by filtration. The benzene is removed by distillation in partial vacuum. The product is nicotinyl ethyl phenyl barbiturate. Note sodium ethyl phenyl barbiturate is an official preparation.

Example 11

206 grams of sodium 5,5-diethyl barbiturate is suspended in 200 cc. of benzene. To this suspension is added 158 grams of nicotinyl chloride. An additional 200 cc. of dry benzene is added to the reaction mixture to precipitate the sodium chloride formed. The sodium chloride is removed by filtration. The benzene is removed by distillation in partial vacuum. The reaction product is nicotinyl diethyl barbiturate. Note sodium diethyl barbiturate is an official preparation.

Example 12

To 492 grams of tri-nicotinyl barbiturate add 84 grams of sodium bicarbonate in 5 volumes of water. This solution is warmed to a temperature of 85° C. for a period of 2½ hours. At the end of this time water is removed by distillation in partial vacuum. To the reaction product is added 157 grams of bromo-benzene suspended in 400 cc. of dry benzene. The sodium bromide is removed by filtration. The benzene is removed by distillation in partial vacuum. The reaction product is tri-nicotinyl phenyl barbiturate.

Example 13

Add 251 grams of cyclohexenylethyl barbiturate to 100 cc. of water. Then to this add 84 grams of sodium bicarbonate. The mixture is refluxed and stirred for a period of 1 hour. At the end of this time the water is evaporated from the mixture. The sodium salt of cyclohexenylethyl barbiturate is added to 200 cc. of dry benzene. To this is added 158 grams of nicotinyl chloride. The sodium chloride is removed by filtration and the benzene is removed by distillation under partial vacuum. The reaction product is nicotinyl cyclohexenylethyl barbiturate.

Example 14

Add 272 grams of sodium nicotinyl barbiturate made in accordance with the examples above to 200 cc. of dry benzene. To this suspension add 178 grams of thienyl chloride. The thienyl chloride is added slowly with stirring under reflux conditions. The reaction mixture after it has partly cooled is separated from the sodium chloride by filtration and the benzene is removed by distillation in partial vacuum. The reaction product is nicotinyl thienyl barbiturate.

Example 15

Add 171 grams of sodium barbiturate prepared in accordance with the above examples to 50 cc. of water. To this while cooling with ice around the vessel add slowly 158 grams of 2 bromopyridine. To this add 300 cc. of dry cold benzene. Separate the water phase containing the dissolved sodium chloride and remove the benzene from the reaction product by distillation in partial vacuum. The resultant product is nicotinyl pyridyl barbiturate.

The foregoing examples and theories of action of the reaction products, and the theories of chemical reactions expressed are merely for the purpose of clarifying and explaining the product of this invention and are not limiting in any way, and do not intend to limit the implications of the present invention or to limit methods of production of the reaction products. Other examples will be apparent to one skilled in the art in furtherance of the purposes and meaning of the present invention.

What is claimed is:
1. A compound having the following general formula:

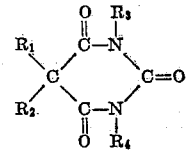

wherein $R_1$ is selected from the group consisting of hydrogen, the ethyl radical, the phenyl radical, the cyclohexenyl radical, the thienyl radical, the pyridyl radical, and the nicotinyl radical, wherein $R_2$ is selected from the group consisting of hydrogen, the ethyl radical and the nicotinyl radical, wherein $R_3$ is selected from the group consisting of hydrogen and the nicotinyl radical, wherein $R_4$ is selected from the group consisting of hydrogen and the nicotinyl radical, and wherein at least one of the groups $R_1$, $R_2$, $R_3$ and $R_4$ is the nicotinyl radical.
2. Mono-nicotinyl barbiturate.
3. Di-nicotinyl barbiturate.
4. Phenyl-nicotinyl barbiturate.
5. Nicotinyl-ethyl-phenyl barbiturate.
6. Nicotinyl-diethyl barbiturate.

References Cited in the file of this patent
UNITED STATES PATENTS 2,703,322    Fox _____ Mar. 1, 1955

OTHER REFERENCES

Physician's Desk Reference, 1952, 6th edition, page 487, Medical Economics, Inc., Rutherford, N.J., 1951.